(12) United States Patent
Lippert et al.

(10) Patent No.: US 6,979,131 B1
(45) Date of Patent: Dec. 27, 2005

(54) MULTIPLE-ROW RADIAL BEARING

(75) Inventors: Roland Lippert, Fürth (DE); Christoph Becker, Herzogenaurach (DE)

(73) Assignee: Ina Wälzlager Schaeffler OHG, Herzogenaurach (DE)

( * ) Notice: Subject to any disclaimer, the term of this patent is extended or adjusted under 35 U.S.C. 154(b) by 0 days.

(21) Appl. No.: 09/719,759

(22) PCT Filed: Dec. 21, 1998

(86) PCT No.: PCT/EP98/08367

§ 371 (c)(1),
(2), (4) Date: Dec. 14, 2000

(87) PCT Pub. No.: WO99/67543

PCT Pub. Date: Dec. 29, 1999

(30) Foreign Application Priority Data

Jun. 23, 1998 (DE) .................. 198 27 859

(51) Int. Cl.⁷ .......................................... F16C 19/40
(52) U.S. Cl. ...................................... 384/551; 384/570
(58) Field of Search ................................ 384/551, 559, 384/561, 569, 570

(56) References Cited

U.S. PATENT DOCUMENTS

| | | | |
|---|---|---|---|
| 1,907,421 A | | 5/1933 | Gibbons |
| 1,970,449 A | * | 8/1934 | Gibbons et al. ............ 384/570 |
| 1,995,571 A | * | 3/1935 | Lott ........................... 384/564 |
| 2,128,668 A | * | 8/1938 | Baker ......................... 384/570 |
| 2,334,227 A | * | 11/1943 | Stallman ..................... 384/569 |
| 2,368,175 A | | 1/1945 | Stanley |
| 2,439,284 A | * | 4/1948 | Buckwalter ................. 384/559 |
| 2,447,928 A | | 8/1948 | Bergstorm |
| 2,747,949 A | | 5/1956 | Smith |
| 3,927,448 A | * | 12/1975 | Jones et al. .................. 384/570 |
| 3,954,313 A | * | 5/1976 | Haenel ........................ 384/569 |
| 4,336,971 A | * | 6/1982 | Reiter ......................... 384/484 |
| 4,558,962 A | | 12/1985 | Meinlschmidt |
| 4,798,482 A | * | 1/1989 | Kruk .......................... 384/559 |
| 4,890,943 A | * | 1/1990 | Tanaka ....................... 384/569 |
| 5,249,871 A | * | 10/1993 | LaTorre et al. ............ 244/3.16 |
| 5,332,318 A | | 7/1994 | Chiba |
| 5,492,419 A | * | 2/1996 | Miller et al. ................ 384/477 |

FOREIGN PATENT DOCUMENTS

| | | |
|---|---|---|
| DE | PS 9 36 306 | 12/1955 |
| DE | AS 10 62 501 | 7/1959 |
| DE | 10 66 814 B | 10/1959 |
| DE | 27 45 842 A | 4/1979 |
| DE | 84 26 143 U1 | 4/1985 |
| DE | 88 03 124 U1 | 6/1988 |
| DE | 39 29 677 A1 | 3/1991 |
| FR | 1 357 456 A | 4/1964 |
| FR | 2 246 766 A | 5/1975 |

OTHER PUBLICATIONS

Bosch, Automotive Handbook, 1993, 3rd Edition p. 211.*
Gänsheimer, J.: Gleitlacke in der Tribotechnik—Helfer in Konstruktion und Automation. In: Kostruktion 36, 1984, Springer-Verlag, H. 10, pp. 391-398.
Technical Book by M. Albert / H. Köttritsch "Wälzlager" [*Rolling-Contact Bearing*], Springer-Verlag, Vienna New York 1987, p. 28.

\* cited by examiner

*Primary Examiner*—Robert A. Siconolfi
(74) *Attorney, Agent, or Firm*—Henry M. Feiereisen

(57) ABSTRACT

A multiple-row radial bearing with at least one bearing race and pertaining rolling bodies, with the bearing race having at least one central collar, is characterized in that the central collar of the bearing race is formed by a single-piece ring (11), which is provided with a slot (12) and has variable diameter, for insertion in a circumferential groove (10).

15 Claims, 2 Drawing Sheets

MULTIPLE-ROW RADIAL BEARING

FIELD OF APPLICATION OF THE INVENTION

The invention relates to a multiple-row radial bearing with at least one bearing race and pertaining rolling bodies, with the bearing race having at least one central collar.

BACKGROUND OF THE INVENTION

A bearing of this type in the form of a double-row cylindrical roller bearing is illustrated in the Technical Book by M. Albert/H. Köttritsch "Wälzlager" [*Rolling-Contact Bearing*], Springer-Verlag, Vienna N.Y. 1987, Page 28. This cylindrical roller bearing includes a single-piece outer race which is provided with a central collar. The pertaining inner race is composed of two partial rings provided with collars on the right side and left side and held together by a retaining element.

A drawback hereby is that, on the one hand, grinding of the raceway of the outer race is more difficult as a result of the central collar, and, on the other hand, both inner bearing rings must be held together by a retaining element. This retaining element has to be fabricated separately and complicates the assembly. A conventional bearing of this type is very cumbersome to produce and to assemble and thus cost-intensive.

SUMMARY OF THE INVENTION

It is therefore an object of the invention to provide a radial bearing of this type which is much easier to make.

This object is attained in accordance with the invention in that the central collar of the bearing race is formed by a single-piece ring, which is provided with a slot and has variable diameter, for insertion in a circumferential groove.

A bearing designed in accordance with the invention has the advantage that the raceways of the rolling bodies are not interrupted in the bearing race over their entire axial extension by a central collar and thus can be ground in one piece, resulting in a significantly simplified grinding process.

In accordance with a further development of the invention, the bearing is configured as double-row radial cylindrical roller bearing with an inner race and an outer race, with the outer race provided with a central collar and the inner race provided with a central collar and two outer collars, whereby the central collar of the outer race is formed by the ring and the inner bearing race is designed in one piece.

The advantage of this variation is the single-piece configuration of the inner bearing race. The need for additional fabrication of the retaining element, required by the prior art heretofore, for both partial bearing races is thus eliminated.

In accordance with another feature of the invention, the slotted ring includes a circumferential outer rib, which is arranged in the groove, and two opposite axial ends, which expand in their radial extension, with the rib being arranged centrally or off-center with respect to the width of the ring.

On the one hand, this ring of inverted T-shaped configuration can be produced in a relatively simple manner as a consequence of the simple cross sectional profile, and, on the other hand, the inverted T-shaped configuration realizes an engagement of the rolling bodies from both sides, i.e. the ring can absorb axial forces in both directions. The axial securement of the ring itself is implemented by the circumferential outer rib which snaps, during assembly, in a groove provided in the raceway. The assembly of the ring may be realized either through threading, i.e. through an axial shift of the ring ends to one another, or through compressing by pushing one ring end below the other ring end. In this manner, a very narrow separating gap is realized, without adversely affecting the engagement of the rolling bodies. The expansion in radial direction of the confronting ends ensures that the engagement area for the end faces of the rolling bodies is as great as possible. But even a wider separating gap is of no consequence because, in this case, the engagement of the rolling bodies is assumed by pertaining collars of the other bearing race.

In accordance with another feature of the invention, the slot extends parallel or at a certain angle to a bearing axis, i.e. is slotted straight. Of course, all other slot arrangements are conceivable.

According to a further feature of the invention, the outer collars of the inner race should be provided with a sealing element.

These sealing elements provide in a manner known that the space receiving the rolling bodies is sealed against ingress of dirt and against loss of lubricant. This can be suitably implemented, for example, by configuring the sealing element as a dragging seal which is held with one end in a groove in the outer collars of the inner race and has an opposite sealing lip which is biased against the outer race. Of course, it is also possible to use a sheet metal disk as sealing element which is secured to one of the bearing races and forms a sealing gap with the other bearing race.

According to another additional feature of the invention, the inner race should be provided with a circumferential lubricating groove and with one or more radial lubricating bores. In this manner, it is ensured that the bearing can be easily supplied with lubricant from inside.

In accordance with another feature of the invention, the ring is subjected to a heat treatment for increasing the hardness.

Finally, the ring should be coated with a friction-reducing material, for example polytetrafluoroethylene (PTFE). PTFE is in particular suitable because of all firm plastics it has the lowest coefficient of friction.

The invention will be described in more detail with reference to the following exemplified embodiment.

BRIEF DESCRIPTION OF THE DRAWINGS

It is shown in.

DETAILED DESCRIPTION OF THE DRAWINGS

Figure 1:
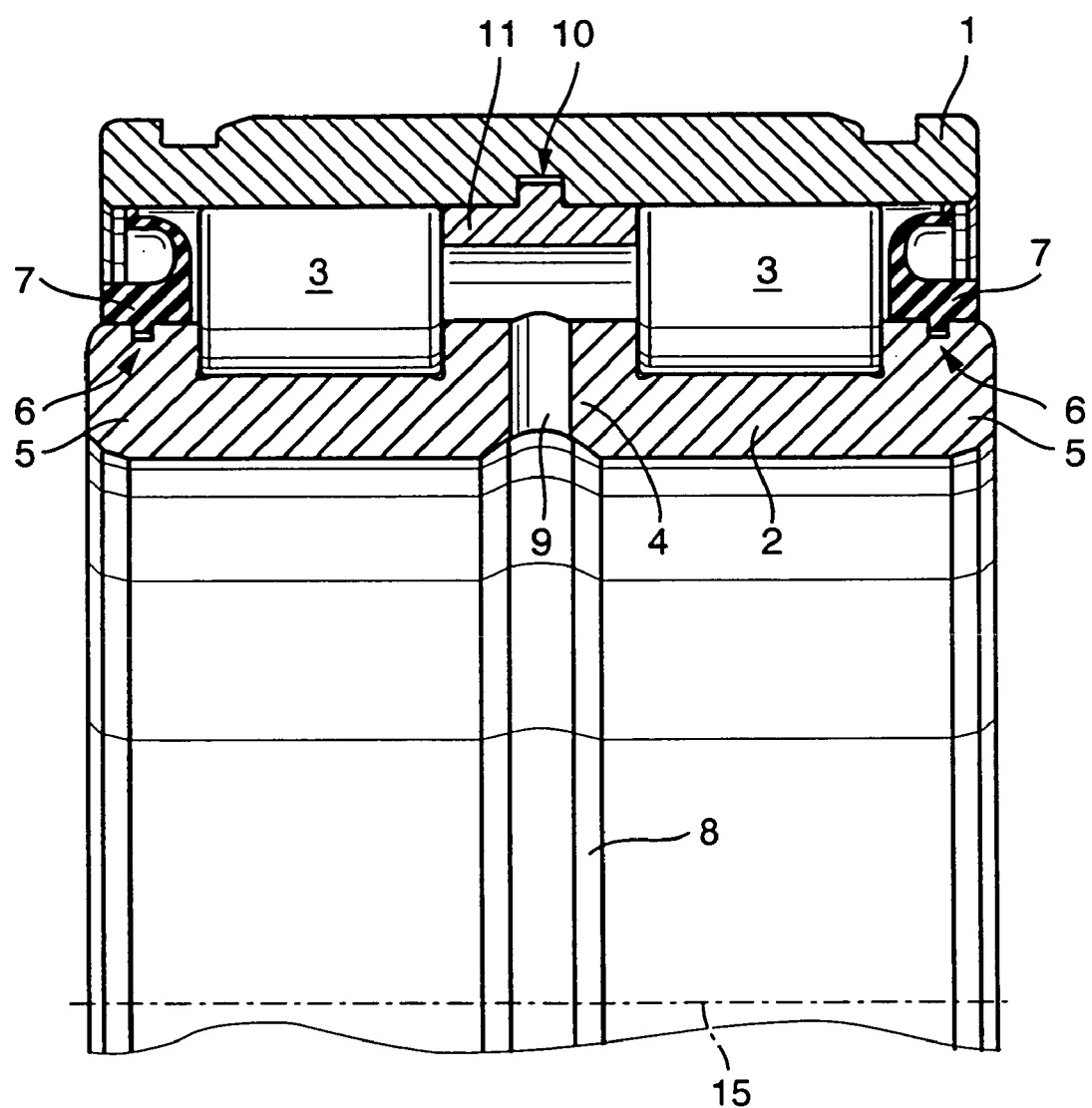
FIG. 1 a partial longitudinal section through a cylindrical roller bearing according to the invention.

FIG. 1 shows a section of one half of a double-row radial cylindrical roller bearing which includes an outer bearing race 1 and a pertaining inner bearing ring 2 between which are disposed two sets of cylindrical rollers 3 rolling on non-labeled raceways. The inner bearing race 2 is provided with a central collar 4 and two outer collars 5 upon which the cylindrical rollers 3 bear with their end faces. The outer collars 5 of the inner race 2 are each provided with a groove 6 for receiving a sealing element 7 which rests with its sealing lip against the confronting running surface of the outer bearing race 1. Furthermore, the inner bearing race 2 has a circumferential lubricating groove 8 from which at one location a lubricating bore branches off in radial direction to terminate in a space between both cylindrical roller sets 3.

Figure 2:
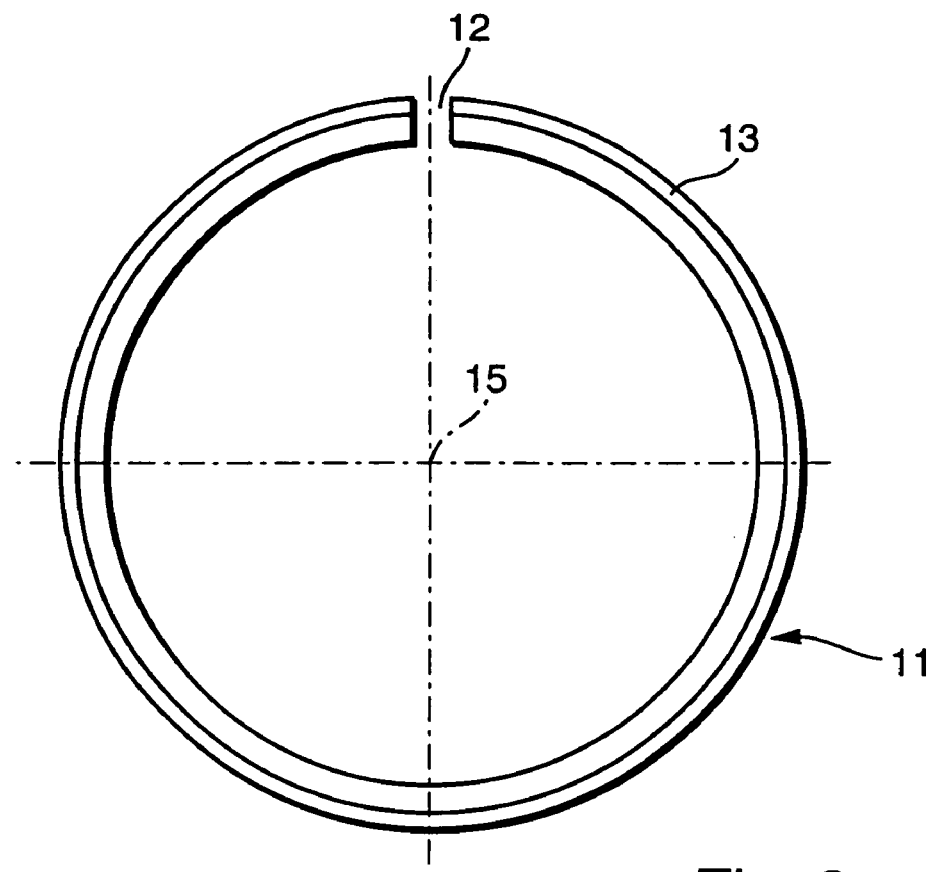
FIG. 2 a side view of a slotted angle ring.
Figure 3:
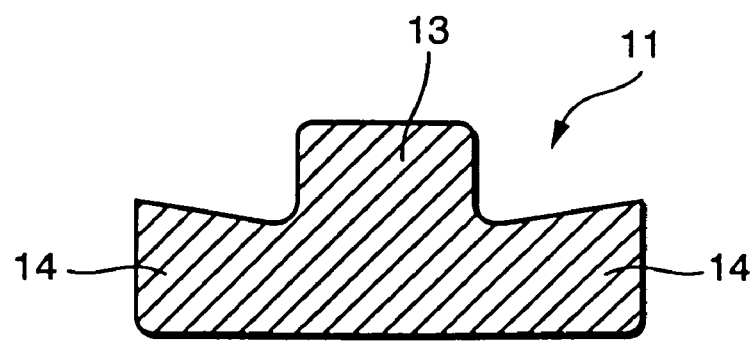
FIG. 3 a longitudinal section through an enlarged angle ring according to FIG. 2.

The outer bearing race 1 has a smooth running surface and is provided centrally with a circumferential groove 10 for receiving a ring 11. As shown in FIG. 2, this ring 11 is provided at a circumferential location with a slot 12 so that its circumference becomes variable. The slot 12 may extend parallel or at a certain angle to a bearing axis 15. This ring 11 is of inverted T-shaped configuration, i.e. it has a radial circumferential outer rib 13 which is guided in the groove 10 of the outer bearing race 1. Both confronting ends 14 of the ring 11 are supported by the raceway of the outer race 1 and their extension expands outwards in axial direction, so that the contact surface for the end faces of the cylindrical rollers 3 is enlarged.

Assembly of such a bearing according to the invention is implemented by pushing the outer bearing race 1 axially over the pre-assembled inner bearing race 2 with cylindrical roller sets 3 and slotted ring 11, until snapping into the groove 10. This means that the diameter of the slotted ring 11 initially decreases when the outer bearing race 1 is slipped over, until being able to expand again when the ring snaps in the groove 10.

REFERENCE CHARACTERS

1 outer bearing race
2 inner bearing race
3 cylindrical roller set
4 central collar
5 outer collar
6 groove
7 sealing element
8 lubricating groove
9 lubricating bore
10 groove
11 ring
12 slot
13 outer rib
14 end
15 bearing axis

What is claimed is:

1. A double-row radial cylindrical roller bearing, comprising:
   a single-piece inner race provided with a central collar and two outer collars;
   an outer race having interiorly a circumferential groove and provided with a central collar in the form of a single-piece T-shaped ring including a slot to provide the ring with variable diameter, said ring having a circumferential outer rib, which is engageable in the circumferential groove, and two opposite axial ends; and
   rolling elements rolling between the inner and outer races.

2. The bearing of claim 1, wherein the inner race is provided with a circumferential lubricating groove and with one or more radial lubricating bores.

3. The bearing of claim 1 defining a bearing axis, said slot extending parallel to the bearing axis.

4. The bearing of claim 1, wherein the outer collars of the inner race are provided with a sealing element.

5. The bearing of claim 1, wherein the ring is subjected to a hardening process.

6. The bearing of claim 1, wherein the ring is coated with a friction-reducing material.

7. The bearing of claim 1, wherein the friction-reducing material is polytetrafluoroethylene (PTFE).

8. A roller bearing, comprising:
   an inner race;
   an outer race in surrounding relationship to the inner race, said outer race having interiorly an annular groove;
   rolling elements rolling between the inner and outer races; and
   a single-piece T-shaped ring formed with an annular rib for securement in the annular groove of the outer race and projecting out from the outer race so as to form engagement surfaces for neighboring rolling elements and thereby being capable to absorb forces applied by the rolling elements in an axial direction;
   wherein the ring is breached by a slot to impart resiliency to the ring.

9. The bearing of claim 1, wherein the axial ends of the ring expand in a radial extension and rest against a running surface of the outer race.

10. The bearing of claim 8 defining a bearing axis, said slot extending parallel to the bearing axis.

11. The bearing of claim 8, wherein the inner race has two outer collars provided with a sealing element.

12. The bearing of claim 8, wherein the inner race is provided with a circumferential lubricating groove and with one or more radial lubricating bores.

13. The bearing of claim 8, wherein the T-shaped ring is subjected to a hardening process.

14. The bearing of claim 8, wherein the T-shaped ring is coated with a friction-reducing material.

15. The bearing of claim 14, wherein the friction-reducing material is polytetrafluoroethylene (PTFE).

* * * * *